United States Patent Office 3,071,239
Patented Jan. 1, 1963

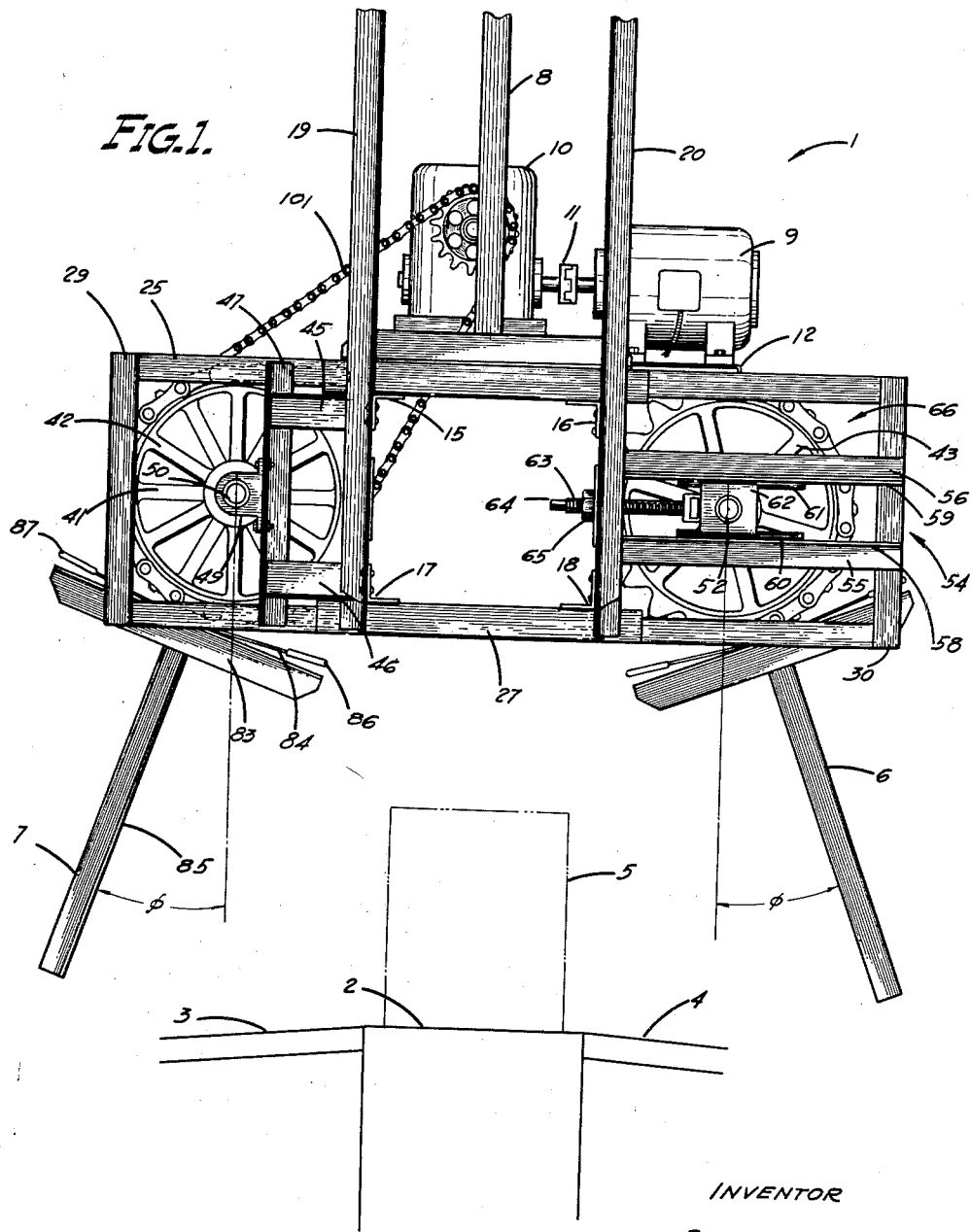

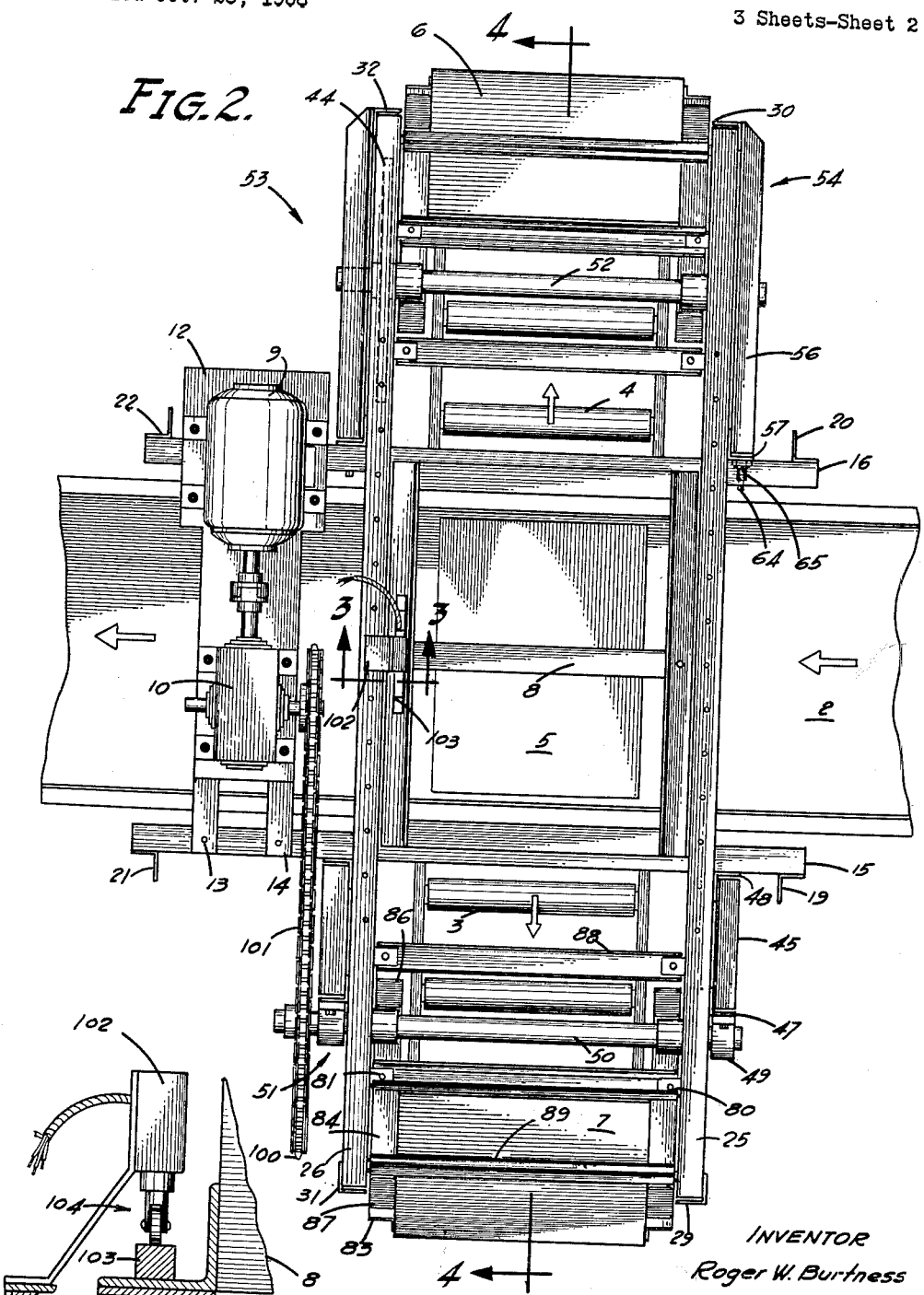

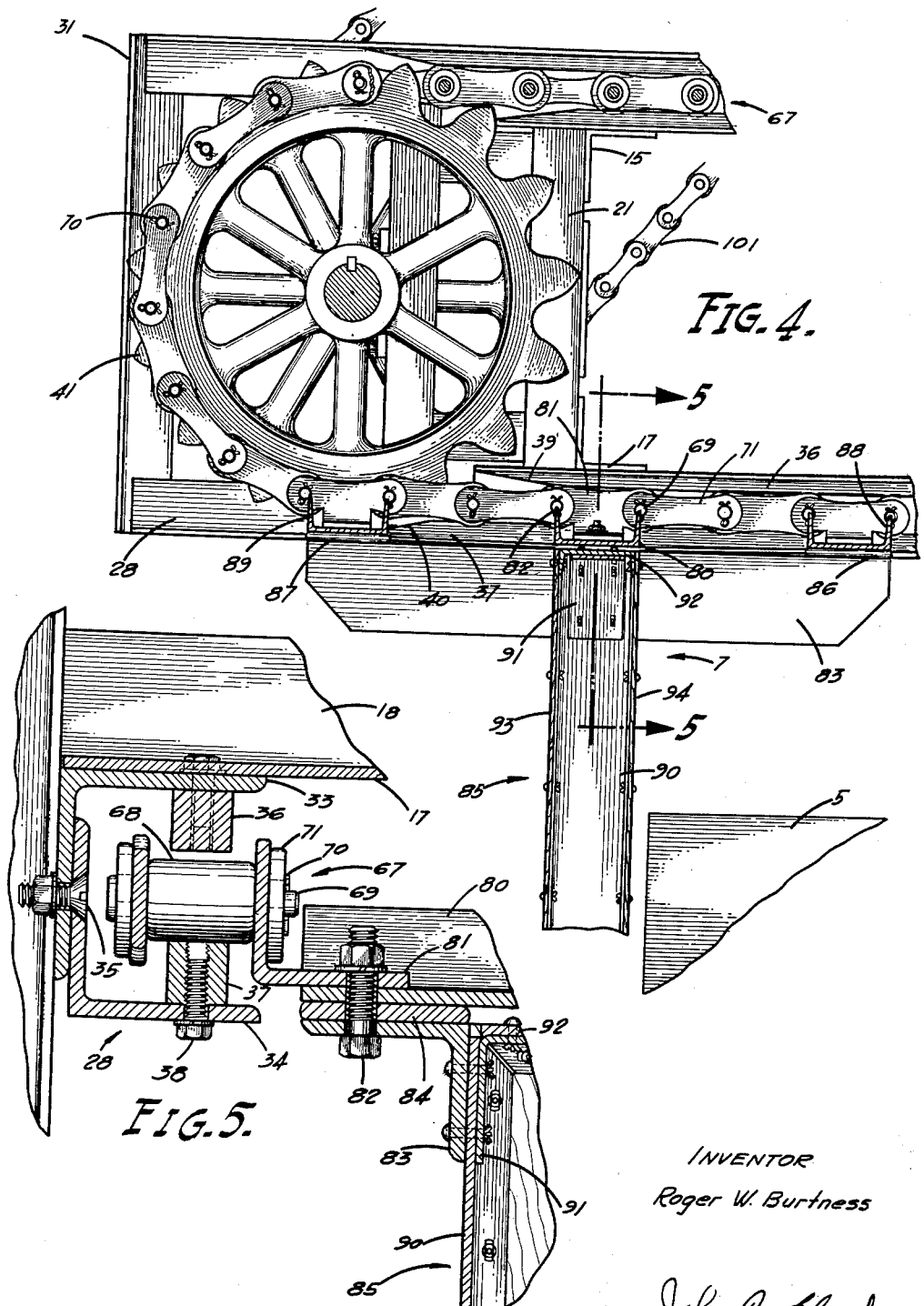

3,071,239
CONVEYOR UNLOADING MECHANISM
Roger William Burtness, La Grange Park, Ill., assignor to Stewart-Warner Corporation, Chicago, Ill., a corporation of Virginia
Filed Oct. 28, 1958, Ser. No. 770,114
5 Claims. (Cl. 198—188)

This invention relates generally to automatic and semi-automatic conveyor systems in which objects are placed on the conveyor for movement to remote stations, at which stations they are automatically and selectively removed by unloading apparatus, and more particularly to an improved mechanism for unloading packages from the conveyor.

A typical semi-automatic conveyor system with which the present invention may be utilized is disclosed in U.S. Patent 2,717,086, issued September 6, 1955, to Bush. Briefly, such a conveyor system may include an endless belt upon which a package is placed at a loading station for movement to a selected one of a plurality of discharge stations. An electrical control system selectively causes the operation of an unloading device at the selected discharge station when the package on the belt reaches a position adjacent said station. The unloading device engages the package and forcibly pushes it from the belt to a gravity conveyor disposed preferably at right angles with respect to the direction of movement of the conveyor belt.

When the speed of the belt is substantially high, for example, one hundred feet per minute, severe timing problems are encountered in the unloading devices. Each unloading device must be started, operated through one cycle to unload a package positioned for unloading a next succeeding package, and stopped during a time interval determined by the speed of the package as it passes the discharge station and the minimum spacing between packages. It can be seen that in a typical installation where it is desired to operate the belt, and therefore the packages, at a speed of one hundred feet per minute with three feet spacing between succeeding packages, the unloading device must be operated at very high speeds.

The reciprocable pusher type unloading device of said patent presents the problem that it must be moved forward then backward before a next succeeding package comes into the path in which it moves. This in effect requires that the discharge device operate at greater than twice the speed that would be necessary if it had to move in one direction only. This device has not been commercially feasible at such belt speeds and package spacings.

Some attempts have been made to correct this problem by mounting a plurality of spaced package-engaging paddles on a pair of spaced sprocket wheels for movement across the path of the conveyor belt. In effect, the operate time of the unloading device was thereby cut in half.

Other attempts to provide a reliably fast unloading device have been only partially successful. However, in the prior atr devices of this type, the unloading devices have been inflexible. They can operate only in one direction if the belt speed is high and if the movement of the packages on the gravity conveyors is slow. Operation of these devices in both directions caused the crushing of packages by a paddle coming down toward the conveyor belt on the side from which a package was previously unloaded only a short time interval before. No simple, economic solution to this problem has been submitted prior to applicant's invention described herein.

Accordingly, it is a primary object of the present invention to provide a very effective, reliable, and economical conveyor unloading mechanism which is operable at high speeds in either of two opposite directions without danger of damaging packages. The feature in the preferred embodiment whereby this is accomplished is the provision of three equally spaced package engaging paddles carried by an endless chain on spaced sprocket wheels. The paddles, chain and wheels are so designed that, in the "at rest" positions of the paddles, one of the paddles is vertically disposed on the side of the chain farthest from the conveyor while the other two paddles are disposed closely adjacent opposite sides of the conveyor in positions on the sprocket wheel peripheries extending away from the conveyor sides at small arcuate angles with a plane which is perpendicular to the package bearing surface of the conveyor and which is parallel to the direction of movement of the conveyor. Thus, at the end of a cycle of paddle movement in either direction, the package-engaging paddle rides around a small arcuate peripheral section of a sprocket wheel defined by the above-said small angle. As the paddle rides around this wheel section, its lower end is rapidly accelerated from chain speed to a speed proportional to the ratio of the distance from the sprocket wheel axis to sprocket wheel periphery and the distance from the axis to the lower end of the paddle. This acceleration is transmitted to the package being unloaded by the paddle to cause it to rapidly clear itself from the path of the paddles.

It is a further object of the invention to provide a conveyor unloading mechanism which rapidly accelerates the package being unloaded toward the end of the cycle of movement of the mechanism.

It is a further object of the present invention to provide a reliable conveyor unloading mechanism which is very fast in its operation, which is sturdy and trouble-free, which requires minimum maintenance, and which is readily adapted to mass production techniques.

Other objects and the many features of the present invention will be appreciated upon a perusal of the following description taken in conjunction with the accompanying drawings in which:

FIG. 1 is a front elevation view of the unloading mechanism and a partial sectional elevation view of the conveyor;

FIG. 2 is a slightly enlarged plan view of the unloading mechanism and a section of the conveyor;

FIG. 3 is an elevation view along line 3—3 of FIG. 2 of the solenoid switch for stopping the unloading mechanism at the proper instant in its cycle of operation;

FIG. 4 is an enlarged, broken away view along line 4—4 of FIG. 2 showing certain of the details of construction of the paddles and their connection with the chain that carries them; and FIG. 5 is an enlarged, broken away view along line 5—5 of FIG. 4 showing certain of the details of the paddle, the chain which carries the paddle, and the supporting structure for the chain.

The preferred embodiment of the present invention comprises unloading mechanism 1 (FIG. 1) which is disposed above a horizontal conveyor belt 2 and gravity conveyors 3 and 4. Packages, such as 5, are carried on the belt 2 from a remote loading position (not shown) to positions below unloading mechanism such as 1. Any one of a number of electrical control systems (not shown) known in the art may be used to selectively operate the unloading mechanism 1 to remove a package 5 when it is destined for gravity conveyor 3 or 4. When the package 5 is in a position in alignment with paddles 6, 7 and 8 of the mechanism 1, the mechanism is operated to cause one of the paddles to engage the package and push it to the desired gravity conveyor 3 or 4.

The mechanism 1 includes a high speed, high starting torque, reversible motor 9. Such motors are commercially available and need not be described. The motor 9 is suitably connected to a conventional gear reducer 10 by means of a clutch 11.

The motor 9 and the gear reducer 10 are suitably secured to a mounting plate 12. The plate 12 in turn is suitably secured to a pair of spaced horizontal cross bars 13 and 14 (FIG. 2) which are perpendicular to the direction of belt movement. The bars 13 and 14 in turn are secured at the opposite ends to a pair of horizontal angle iron members 15 and 16 which are parallel to the direction of conveyor belt travel and which are disposed on either side of the belt 2. A second pair of parallel angle iron members 17 and 18 (FIG. 1) are positioned below the members 15 and 16. The outer ends of the members 15–18 are suitably secured to four vertically disposed angle iron support members 19–22 inclusive. The members 19–22 are suitably secured to an overhead supporting structure (not shown).

The members 15–18 inclusive carry the supporting and driving structure for the paddles 6–8. More specifically, the upper members 15 and 16 carry spaced, parallel, transverse track sections 25 and 26 (FIG. 2). Similarly, the lower members 17 and 18 carry spaced track sections 27 (FIG. 1) and 28 (FIG. 4). The ends of the track sections 25 and 27 are connected to vertically disposed angle iron members 29 and 30 (FIG. 2), and the ends of track sections 26 and 28 are connected to vertically disposed angle iron members 31 and 32.

The four track sections are similar; and, therefore, only one will be described. With particular reference to FIGS. 4 and 5, it can be seen that the track section 28 comprises a pair of elongated angle iron members 33 and 34. The members 33 and 34 are rigidly secured together by a plurality of nuts and bolts such as 35 to form a generally U-shaped section with its open end facing toward the center of the mechanism 1. The outer member, in this case the lower member 34, is preferably longer than the other member, in this case 33; and it is rigidly secured to the vertical members 31 and 32, for example, by welding. The inner horizontal surface of each member carries a chain roller guide track. Thus, the members 33 and 34 carry tracks 36 and 37 respectively which are secured by means of screws 38. The opposite ends of the tracks 36 and 37 are tapered outwardly as at 39 and 40. The support of the track section 28 is provided by members 17 and 18. Track section 27 is similarly carried by the members 17 and 18, and the track sections 25 and 26 are carried by members 15 and 16.

Hence, it can be seen that the mechanism 1 includes a prime mover, a chain, and a paddle supporting structure all rigidly secured to the four upright members 19–22 inclusive.

Two pairs of opposed sprocket wheels 41, 42 and 43, 44, are carried by the members 15–18 and the track sections 25–28. More specifically, the wheels 41, 42 are carried on one side by a bracket structure comprising a pair of horizontally disposed angle iron members 45 and 46 (FIG. 1) which are secured to upright angle iron members 47, 48 (FIG. 2). The upright members 47 and 48 are rigidly secured to the members 15, 17 and to the track sections 25, 27 respectively. The member 47 carries a bearing member 49 (FIG. 1). The bearing member 49 rotatably receives a shaft 50 of the wheels 41, 42. A similar support assembly 51 (FIG. 2) rotatably supports the other end of the shaft 50.

The sprocket wheels 43, 44 are keyed to a shaft 52 (FIG. 2). Opposite ends of the shaft 52 are supported by similar adjustable assemblies 53, 54. As best seen in FIG. 1, the assembly 54 comprises a pair of horizontal angle iron members 55 and 56. The right-hand ends of the members 55 and 56 are rigidly secured to the upright member 30. The opposite ends of the members 55 and 56 are rigidly secured to an upright angle iron member 57 (FIG. 2), which latter member is rigidly secured to the members 16 and 18.

The juxtaposed sides 58, 59 of the members 55 and 56 extend outwardly and horizontally from the mechanism 1. These sides 58 and 59 carry fixed guide members 60 and 61 which lie in a plane perpendicular to the axis of the shaft 52. A bearing block 62 includes upper and lower longitudinal slots (not shown) for receiving the guide members 60 and 61, whereby the bearing block 62 is moveable reciprocably along the members 60, 61.

The bearing block 62 rotatably receives the shaft 52. The left hand side (FIG. 1) of the bearing block 62 has a screw 63 secured rotatably thereto. The free end 64 of the screw 63 is preferably rectangular for receiving a wrench to rotate the screw. The central threaded part of the screw 63 is received by an internally threaded nut which nut is rigidly affixed to the upright member 57 (FIG. 2).

By rotating the screw 63 one way or the other, the bearing block 62, and therefore the sprocket wheels 43 and 44, may be moved toward or away from the opposite pair of sprocket wheels 41, 42. An endless chain 66 carried by the sprocket wheels 42, 43 is thereby adjusted by means of screw 63 to an optimum degree of tautness. An endless chain 67 carried by the sprocket wheels 41 and 44 is similarly adjusted by the assembly 53.

The chain 67 comprises spaced rollers 68 (FIG. 5). The rollers 68 include axial bores through which connector pins 69 are received. The pins 69 are headed at one end and include a transverse bore on the other end for receiving cotter pins 70. Succeeding connector pins are connected with each other by means of rigid elongated elements 71 which include apertures adjacent either end for receiving the pins. Except as otherwise described, each pin 69 will be connected to four elements such as 71, that is, two on either side of its roller 68. One of these members on each side of the roller is connected to the next preceding pin and the other pair of members is connected to the next succeeding pin. The pin rollers 68 in their horizontal positions between opposed sprocket wheels are received and supported by the opposed guide tracks, such as 36, 37.

The paddles 6, 7 and 8 are supported at their ends by the pins 66 and 67. The paddles are similar and are connected in a similar manner to the chains. Hence, only one paddle will be described. As best seen in FIGS. 4 and 5, the paddle 7 is generally T-shaped. In FIG. 4, the paddle 7 is shown in the verticle position in which it is about to engage a package 5 as it moves toward the right.

The paddle 7 includes an upper elongated member 80 which extends from chain 66 to chain 67. The member 80 is generally U-shaped in cross section with its base extending away from the central portion of the mechanism 1. Opposite ends of the base of the member 80 are rigidly secured to brackets such as 81 by means of nut and bolt assemblies 82. The bracket 81 is generally L-shaped with a vertically extending portion being received and supported by adjacent connector pins 69 and 82. This bracket 81 replaces one of the connecting elements 71 which would otherwise have connected the adjacent pins 69, 82. The other end of the member 80 is similarly secured to the chain 66.

A second elongated L-shaped bracket 83 is secured to the lower surface of the member 80 with a spacer 84 interposed therebetween. The bracket 83 is rigidly secured to the package-engaging section 85 of the paddle. The spacer 84, as best seen in FIG. 1, is an elongated strip of spring steel which is urged into a generally arcuate configuration projecting away from the bracket 83 at its outer ends 86 and 87. The ends 86 and 87 are covered with a plastic material such as nylon to absorb the shock encountered as the paddle 7 initially engages a package 5.

The outer ends of the bracket 83 are shown in engagement with the spring ends 86 and 87 in FIG. 4. The spring ends in turn are in engagement with a pair of channel members 88 and 89 which are similar to member 80 and which are connected to the chains 66 and 67 in a similar manner. Thus, as the paddle 7 engages the package 5, it is supported and retained in position by the three channel members 80, 88 and 89. Also, since the opposite end of the paddle 7 has a similar supporting and backing structure, no twisting movement of the paddle 7 will be possible. There is, however, a certain amount of slack to permit some deflection of the paddle 7 upon its initial engagement with the package 5. This is provided by the distance between the upper edge of the chain rollers 68 and the upper track 36. This will prevent extreme shock forces from deforming the paddle and from damaging the chains 66 and 67.

In the preferred embodiment, the package-engaging portion 85 of the paddle 7 is of a hollow sheet metal construction. The section 85 (FIGS. 4 and 5) comprises a pair of elongated rectangular end panels, such as 90, which are secured to the elongated brackets, such as 83. An inverted U-shaped channel member 91 is secured between the end panels 90. A shallow channel member 92 is secured to the upper surface of the member 91 with its opposed sides extending over and covering the longitudinal edges of the member 91. A pair of side panels 93 and 94 are secured at their upper ends to the channel member 92 and along their sides to the end panels 90. The lower end of section 85 is preferably closed with a generally cup-shaped supporting member of rectangular cross section (not shown).

The upper end (FIG. 2) of the shaft 50 carries an additional sprocket wheel 100 which is keyed thereto. A chain 101 connects a sprocket wheel 100 to the output of the gear reducer 10 to provide a driving connection for the sprocket wheels 41 and 42 and, therefore, for the chains 66 and 67 and the paddles 6, 7 and 8.

FIGS. 2 and 3 show a solenoid switch 102 which includes a pair of contacts (not shown) which are opened when the paddles 6, 7 and 8 reach the positions in which they are to be stopped. The solenoid 102 will then be operated by the paddle which is in the upper vertical position in which paddle 8 is shown in FIG. 1. In this position, an elongated bar 103 engages a solenoid plunger structure 104 to raise the structure to open contacts. The ends of the bar 103 are tapered to permit the plunger structure 104 to smoothly ride up to the top surface of the bar.

It will be recalled that, in the preferred embodiment, the paddles are to be arranged so that they are equally spaced and so that the two lower paddles assume "at rest" positions substantially as shown in FIG. 1. As described earlier, this will permit acceleration of a package 5 on the gravity conveyor 3 or 4, as the respective paddle 6 or 7 progresses from a vertical position through the angle $\phi$ to its shown position. This is accomplished at no sacrifice of minimum paddle travel or in extreme loads incident to the initial engagement of the package by the paddle.

An angle $\phi$ of approximately fifteen degrees has been found to be desirable; however this may be varied in any given installation.

It is also noted that more than three paddles may be used, for example by increasing the length of the chains 66, 67 and adding an additional pair of sprocket wheels above wheels 41–44 to take up the slack in the chains.

In determining the relationships between the dimensions of various components for making apparatus in accordance with the teachings of the present invention, reference may be had to the following characteristics of a preferred embodiment.

The distance between paddles 6, 7 and 8 is one-third the length (L) of chain 66, or L/3. This distance also equals the distance ($d$) between the axes of shafts 50, 52 plus the circumferential distances of the centers of paddles 6 and 7 from the vertical, or $d+2\cdot\phi/360\cdot2\pi r$, where $r$ is the radius of the sprocket wheels 41–44. Since $\phi$ has been assumed to be fifteen degrees, the latter function becomes $d+\pi r/6$.

The length (L) also equals $2d+2\pi r$. Equating the two functions we find:

$$3(d+\pi r/6)=2d+2\pi r$$

or $$d=3\pi r/2$$

The distance $d$ between shaft centers is preferably selected with respect to the maximum package width and positioning on the belt 2 and the distance required for stabilization of the paddle by the channel members 88, 89 as shown in FIG. 4. When $d$ has been selected, the radius $r$ of the sprocket wheels 41, 44 and the distance L/3 between paddles may be determined from the formulae set forth above.

The operation of the mechanism 1 will now be described. The drive motor 9 for the unloading mechanism 1 may be operated over any one of a number of conventional circuits. For example, a pair of mechanically interlocked starting solenoids may complete respective three-phase circuits for operating the motor 9 in its forward or reverse direction. When one of the solenoids is energized, it mechanically interlocks the other solenoid to prevent its operation. Once one of the solenoids is energized, for example, by pulse of short time duration, a holding circuit (not shown) including the contacts of switch 102 is prepared for said solenoid. The motor starts very rapidly since it is a high starting torque motor and very quickly disengages the bar 103 from the plunger structure 104. The contacts of the solenoid 102 close to complete the holding circuit. As the mechanism completes one cycle of operation, that is, the chains 66 and 67 move a distance equal to one-third of their length, the bar corresponding to 103 of the paddle approaching the upper vertical position engages the plunger structure 104 to open the contacts of the solenoid 102, thereby to open the circuit of the motor 9. The motor 9 and the paddles stop.

As the paddle 7 rotates counterclockwise through one cycle of operation of the mechanism 1, its package engaging section 85 assumes a vertical position (FIG. 4) prior to engagement with a package 5. In this position, the two upper transverse angle irons, such as 83 (FIG. 4) are supported and backed up at the central and end portions. The paddle 7 then moves horizontally across the belt 2 (FIG. 1) pushing the package 5 ahead of it. The package 5 is pushed by the paddle 7 to the gravity conveyor 4. After the section 85 of the paddle 7 reaches a position directly below the shaft 52 and while it is still in engagement with the package 5, it begins to move circumferentially about the periphery of the sprocket wheels 43 and 44. Now it will be noted that the lower portion of the section 85, instead of traveling at the same speed as the chain, begins to move at a speed proportional to its distance from the axis of the shaft 52 divided by the radius of the sprocket wheels. It will be readily appreciated that with the proportions shown in FIG. 1 that the lower end of the section 85 will be moving at a speed approximately four and one-half times the speed of the chain. Hence, the lower portion of the section 85 is rapidly accelerated as it begins its movement about the periphery of the sprocket wheels 43, 44. This rapid acceleration will be transmitted to the package 5 to give it an extra push which assures its movement beyond the path taken by the paddles 6, 7 and 8. Hence, the package will suffer no damage in the event that the next cycle of operation of the mechanism 1 is in clockwise direction to transfer the next succeeding package from the belt 2 to the conveyor 3.

While there has been described what is at present believed to be the preferred embodiment of the invention, it will be understood that various changes and modifications may be made therein; and it is contemplated to cover in the appended claims all such changes and modifications as fall within the true spirit and scope of the invention.

What is claimed is:

1. A mechanism for unloading packages from a package-bearing surface of a conveyor onto a slow-operating unloading ramp comprising at least one pair of spaced sprocket wheels each wheel disposed adjacent a respective side of the package-bearing surface of the conveyor, an endless chain, means including the sprocket wheels for supporting the chain with one chain path section from one sprocket wheel to the other being adjacent and substantially transverse to the direction of movement of the surface, a plurality of package-engaging paddles greater in number than two non-pivotably secured to and supported by the chain in substantially equally spaced relationship with two of the paddles in all at rest positions of the mechanism being disposed closely adjacent the sides of the package-bearing surface on the peripheries of the two sprocket wheels angularly displaced away from the chain path section by a small acute angle, whereby the motion of each paddle at its outer free end accelerates rapidly as the paddle-supporting portion of the chain moves from the end of said chain path section to its at rest position to accelerate the movement of a package at the end of a cycle of operation of the mechanism, and a prime mover including means for selectively causing movement of the chain in either direction across the conveyor.

2. A mechanism for unloading packages from a package-bearing surface of a conveyor onto a slowly operating unloading ramp comprising at least one pair of spaced sprocket wheels each wheel disposed adjacent a respective side of the package-bearing surface of the conveyor, an endless chain, means including the sprocket wheels for supporting the chain with one chain path section from one sprocket wheel to the other being adjacent and substantially transverse to the direction of movement of the surface, a plurality of package-engaging paddles greater in number than two, non-pivotable means for securing the paddles to the chain in substantially equally spaced relationship with two of the paddles in all at rest positions of the mechanism being disposed closely adjacent the sides of the package-bearing surface on the peripheries of the two sprocket wheels angularly displaced away from the chain path section by a small acute angle, whereby the motion of each paddle at its outer free end accelerates rapidly as the paddle-supporting portion of the chain moves from the end of said chain path section to its at rest position to accelerate the movement of a package at the end of a cycle of operation of the mechanism, and a prime mover including means for selectively causing movement of the chain in either direction across the conveyor.

3. A mechanism for unloading packages from a package-carrying portion of a conveyor selectively in either of two directions onto a slow operating unloading ramp comprising at least a pair of spaced sprocket wheels each positioned adjacent a respective side of the package-carrying portion of the conveyor, an endless chain carried by the sprocket wheels, a reversible prime mover for driving at least one of the sprocket wheels to thereby move the chain, and at least three equally spaced paddles carried by the chain in non-pivotable relation therewith for engaging packages carried by the conveyor to remove them from the conveyor, and the distance between the wheels and the wheel diameters being fixed to cause adjacent paddles in all at rest positions of the mechanism to extend outwardly from the sprocket wheels to define substantially equal predetermined small angles with lines defined by the axes of the sprocket wheels and the corresponding circumferential positions on the outer periphery of the sprocket wheels at which the chain tangentially engages each sprocket wheel, whereby the paddle motion at its outer free end accelerates rapidly as the portion of the chain connected with the paddle travels from said tangential position to said at rest position at the end of each cycle of operation of the mechanism.

4. A mechanism for unloading packages from a package-carrying portion of a conveyor selectively in either of two directions onto a slow-operating unloading ramp comprising: two pairs of sprocket wheels, each pair carried by a respective common shaft adjacent a respective side of the package-carrying portion of the conveyor; a pair of endless chains carried by corresponding sprocket wheels in each pair and defining a path section from one pair of wheels to the other adjacent and transverse to the package-carrying portion of the conveyor; at least three equally spaced paddles carried by and between the chains in non-pivotable relation therewith for engaging packages carried by the conveyor to remove them from the conveyor; the distance between the shafts, the distance between the paddles, and the wheel diameters being fixed to cause two of the paddles in all at rest positions of the mechanism to be disposed each adjacent a respective side of the package-carrying portion on the peripheries of its respective wheel pair angularly spaced away from the chain path section by a small acute angle; whereby the motion of at least one package-engaging portion of each paddle subsequent to its engagement with a package is accelerated rapidly as it moves from the chain path section and through said acute angle to an at rest position on the peripheries of a sprocket wheel pair.

5. A mechanism for unloading packages from a package-bearing surface of a conveyor onto a slow operating unloading ramp comprising at least one pair of spaced sprocket wheels, said wheels being rotatable about respective parallel axes disposed on opposite sides of the package-bearing surface of the conveyor, means including the sprocket wheels for supporting the chain with one chain path section from one sprocket wheel to the other being adjacent and substantially transverse to the direction of movement of the surface, a plurality of package engaging paddles non-pivotably secured to said chain whereby they always extend from the chain at a fixed angle thereto, said paddles being substantially equally spaced about the chain path at a distance from one another at least slightly greater than the distance between said two axes, whereby the motion of each paddle at its outer free end accelerates rapidly as the paddle supporting portion of chain moves from the end of said chain path section to its "at rest" position to accelerate the movement of a package at the end of a cycle of operation of the mechanism, and a prime mover including means for selectively causing movement of the chain in either direction across the conveyor.

References Cited in the file of this patent

UNITED STATES PATENTS

| | | |
|---|---|---|
| 2,546,951 | Petrilli | Mar. 27, 1951 |
| 2,713,434 | Belk | July 19, 1955 |
| 2,758,728 | Henry | Aug. 14, 1956 |
| 2,814,378 | Ekholm | Nov. 26, 1957 |

FOREIGN PATENTS

| | | |
|---|---|---|
| 39,987 | Austria | Dec. 10, 1909 |